United States Patent
Brisebois et al.

(10) Patent No.: US 8,537,674 B2
(45) Date of Patent: Sep. 17, 2013

(54) DATA BUNDLING AND FAST DORMANCY BASED UPON INTERACTIVITY

(75) Inventors: Arthur Richard Brisebois, Cumming, GA (US); Yonghui Tong, Alpharetta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 309 days.

(21) Appl. No.: 12/947,212

(22) Filed: Nov. 16, 2010

(65) Prior Publication Data

US 2012/0120799 A1  May 17, 2012

(51) Int. Cl.
*H04L 12/26*  (2006.01)

(52) U.S. Cl.
USPC ........................................................ 370/231

(58) Field of Classification Search
USPC ........................................................ 370/231
See application file for complete search history.

(56) References Cited

U.S. PATENT DOCUMENTS

| | | | | |
|---|---|---|---|---|
| 2005/0239435 A1* | 10/2005 | Ikeda et al. | ................... | 455/403 |
| 2006/0123052 A1* | 6/2006 | Robbin et al. | ............. | 707/104.1 |
| 2006/0206890 A1* | 9/2006 | Shenfield et al. | ............. | 717/174 |
| 2007/0168417 A1* | 7/2007 | Swanburg et al. | ............. | 709/203 |
| 2009/0124249 A1* | 5/2009 | Young et al. | ................ | 455/422.1 |
| 2011/0087975 A1* | 4/2011 | Karsten | ........................ | 715/762 |
| 2012/0281535 A1* | 11/2012 | Day | .............................. | 370/235 |

* cited by examiner

*Primary Examiner* — Hassan Kizou
*Assistant Examiner* — Tejis Daya
(74) *Attorney, Agent, or Firm* — Turocy & Watson, LLP

(57) ABSTRACT

A system and methodology that performs data bundling and controls fast dormancy based on user interaction with a user equipment (UE) is provided. Moreover, the system provides a balance between saving battery power of the UE and reducing signaling and processing load in a radio resource controller (RRC). Specifically, the system observes user inputs and data flow requests to identify "interactive" and "non-interactive" data flows. On receiving a data flow request, the system determines whether the data flow can be bundled together and transmitted over a single connection with disparate data flows, based on the classification of the data flow. Additionally, on completion of a data flow, the system determines whether a fast dormancy timer can be disabled/delayed to transmit a next data flow over the current connection, based on the classification of the data flow.

20 Claims, 12 Drawing Sheets

DATA BUNDLING AND FAST DORMANCY BASED UPON INTERACTIVITY

TECHNICAL FIELD

The subject disclosure relates to wireless communications and, more particularly, to a mechanism, that facilitates data bundling and fast dormancy based on user interaction with a user equipment (UE), to reduce network signaling in a communication network.

BACKGROUND

Universal Mobile Telecommunications System (UMTS) networks have seen an explosive data growth in past few years and, in the future, are expected to see continuing growth in the Packet Switched (PS) domain. Beyond growth of data traffic volume, an even more aggressive growth in data signaling load has been detected. Among all the signaling messages/procedures on UMTS networks, Radio Access Network (RAN) signaling procedures have caused the most growth and impact. This is due to complicated radio resource sharing techniques required to conserve resources occupied by various users and services.

The majority of RAN signaling events are for connection setup and state transitions (e.g., during Channel Switching). Typically, when a data payload is to be sent from/received by a user equipment (UE), a request is sent to a radio network controller (RNC) to establish a dedicated channel (DCH). Once the data payload is sent or received, multiple inactivity timers are triggered by the RNC and upon expiration of the timers, the RNC transitions the UE from DCH to forward access channel (FACH) and then to IDLE state. To achieve resource efficiency, such timers are often set to short values (cumulatively around 12-16 seconds). Thus, the UE is quickly moved into the IDLE state after completion of a current data session (download and/or upload). Since there is no active data connection between the UE and the core network during the IDLE state, power consumption is minimized. However, if a new data payload is received shortly, a new data connection is requested and established between the UE and the RNC. As a result, even though battery life of the UE is conserved, a large number of signaling events are generated and RNC processing load is substantially increased.

In addition to network initiated inactivity-based state transition, UE manufacturers have introduced a fast dormancy (FD) feature that initiates direct transition from DCH to IDLE or FACH to IDLE, before the respective network inactivity timer expires. In this type of system control, the UE proactively releases the data connection, established by the RNC, directly from DCH to IDLE or FACH to IDLE as quickly as possible, to further conserve UE battery life. However, once the UE is in the IDLE state, the data connection must be reestablished to communicate another payload. The reestablishment of the data connection is resource intensive, consumes a high amount of power in the RNC, and can significantly drive up the RNC load.

SUMMARY

The following presents a simplified summary of the specification in order to provide a basic understanding of some aspects of the specification. This summary is not an extensive overview of the specification. It is intended to neither identify key or critical elements of the specification nor delineate any scope particular embodiments of the specification, or any scope of the claims. Its sole purpose is to present some concepts of the specification in a simplified form as a prelude to the more detailed description that is presented later.

The systems and methods disclosed herein, in one aspect thereof, can facilitate bundling data sessions and controlling fast dormancy based on interactivity with a user equipment (UE). Moreover, the system includes a user interactivity (UI) engine that can bundle application data and/or control fast dormancy on completion of a data flow, based on "interactivity" data. Moreover, the system monitors user input and data flow requests and the UI engine categorizes each data flow request as "interactive," or "non-interactive," according to the user input that preceded it. In one aspect, the system can bundle the "non-interactive" data flows and disable or delay fast dormancy for "interactive" data flows.

According to an aspect, the system, via enabling data bundling and controlling fast dormancy, reduces the number of radio resource control (RRC) connection establishments (as part of data connection setup) and thus minimizes Radio network controller (RNC) processing load and call setup time (latency). Moreover, the system can bundle closely spaced data payloads and stack data packets from one or more applications in one single connection. This results in decreased number of signaling events and reduces RNC processing load. Further, by temporarily disabling fast dormancy the system can avoid unnecessary and pre-mature data connection releases (and corresponding new data connection setups).

Another aspect of the disclosed subject matter relates to a method that can be employed to facilitate data bundling and fast dormancy based on observing user interaction and/or radio loading indications. The method comprises comparing the time at which a data flow request is received with a time at which the last user input was received. If the time at which a data flow request is received is greater than the time at which the last user input was received, by a predefined threshold, then the data flow request can be stored in a delay cache and bundled with one or more data flow requests; else, the data flow can be transmitted. Yet another method of the disclosed subject matter comprises comparing the time at which a data flow is completed with a time at which the last user input was received. If the time at which a data flow is completed is greater than the time at which the last user input was received, by a predefined threshold, then a fast dormancy mechanism can be triggered to transition the UE to an IDLE state; else, the fast dormancy mechanism can be disabled/delayed.

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

DETAILED DESCRIPTION

Figure 1:
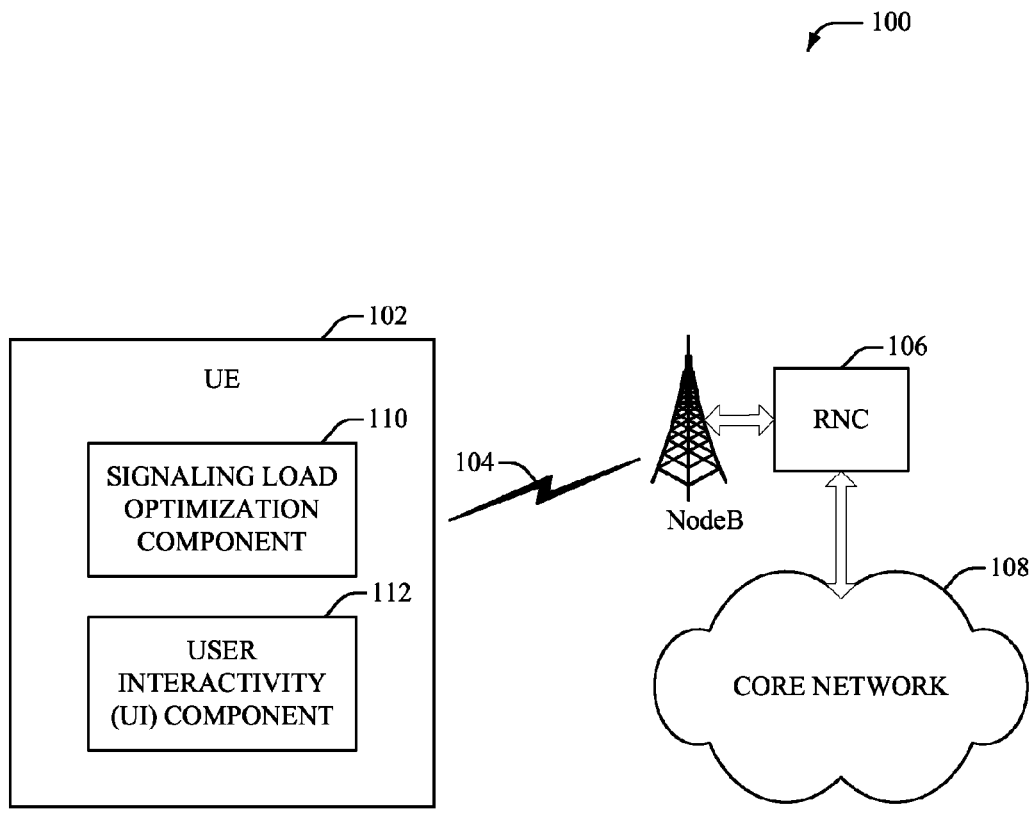
FIG. 1 illustrates an example system that facilitates signaling load optimization in a communication network.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

As used in this application, the terms "component," "module," "system," "interface," "platform," "service," "engine," or the like are generally intended to refer to a computer-related entity, either hardware, a combination of hardware and software, software, or software in execution or an entity related to an operational machine with one or more specific functionalities. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. As another example, an interface can include I/O components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device or computer-readable storage/communications media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

In addition, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms like "user equipment," "mobile station," "mobile," subscriber station," "access terminal," "terminal," "handset," "mobile device," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," and the like, are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows.

Furthermore, the terms "user," "subscriber," "customer," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms), which can provide simulated vision, sound recognition and so forth. In addition, the terms "data flow," "data session," and the like are also employed interchangeably throughout the subject specification, unless context warrants particular distinction(s) among the terms.

The systems and methods disclosed herein reduce signaling load in a wireless communication network that employs on-demand resource allocations, and shorten user perceived latency with minimum loss on battery life of a user equipment (UE). Moreover, the disclosed systems and methods control data bundling and/or fast dormancy based on user interactions with the UE. Specifically, the UE monitors user activity and tunes data bundling and/or fast dormancy techniques accordingly, as explained in detail infra.

Aspects, features, or advantages of the subject innovation can be exploited in substantially any wireless communication technology; e.g., Universal Mobile Telecommunications System (UMTS), Wi-Fi, Worldwide Interoperability for Microwave Access (WiMAX), General Packet Radio Service (GPRS), Enhanced GPRS, Third Generation Partnership Project (3GPP) Long Term Evolution (LTE), Third Generation Partnership Project 2 (3GPP2) Ultra Mobile Broadband (UMB), High Speed Packet Access (HSPA), or Zigbee. Additionally, substantially all aspects of the subject innovation can be exploited in legacy telecommunication technologies.

Referring initially to FIG. 1, there illustrated is an example system 100 that facilitates signaling load optimization in a communication network, according to an aspect of the subject specification. Moreover, system 100 performs data bundling and fast dormancy based on analyzing user interaction with a user equipment (UE) 102, to reduce network signaling 104 between the UE 102 and a Radio Network Controller (RNC) 106. Typically, the core network 108 can include a UMTS network; however, it can be appreciated that the subject innovation is not so limited and most any communication network can be utilized. The core network 108 can provide on-demand resource allocations and can be connected to various backbone networks (not shown) for example, the Internet, Integrated Services Digital Network (ISDN), etc.

Typically, UE 102 can include most any electronic communication device such as, but not limited to, most any consumer electronic device, for example, a digital media player, a digital photo frame, a digital camera, a cellular phone, a personal computer, a personal digital assistant (PDA), a smart phone, a laptop, a gaming system, etc. Further, UE 102 can also include LTE based devices, such as, but not limited to, most any home or commercial appliance that includes an LTE radio. It can be appreciated that the UE 102 can be mobile, have limited mobility and/or be stationary.

When a data payload is to be transferred between the UE 102 and the core network 108, the UE 102 sends request to the RNC 106, requesting resources to establish a connection. Once the transfer is complete (e.g., data payload is sent or received), the RNC 106 activates multiple inactivity timers, which facilitate channel switching at the UE 102. In one example, upon expiration of the timers, the UE 102 can transition from a dedicated channel (DCH) to a Forward Access Channel (FACH) and then to an IDLE state. Oftentimes, the inactivity timers are set to short values (e.g., cumulatively around 12-16 seconds) to achieve resource efficiency. The short values enable the UE 102 to quickly move to IDLE state after completion of current data session (download or upload).

In addition to network initiated inactivity-based state transition, the UE 102 can also perform fast dormancy (FD) to initiate direct transition from DCH to IDLE or FACH to IDLE, before network inactivity timer expires. The FD feature in the UE 102 reduces power consumption in the UE 102, by transitioning the UE 102 to the IDLE mode and releasing the connection as quickly as possible. In traditional systems, when more data is expected after the UE 102 releases the connection, the connection needs to be reestablished, which can significantly increase the RNC load. However, according to an embodiment of the subject system, UE 102 includes a signaling load optimization component 110 that identifies such cases (e.g., when data communication is expected) and deactivates the FD mechanism and/or performs data bundling for closely spaced sequential data sessions.

According to an aspect, UE 102 can include a user interactivity (UI) component 112, which tracks and/or records user interaction with the UE 102. Moreover, the UE 102 can bundle data sessions and control FD based upon the user interaction and/or radio loading indications. The UI component 112 can observe and analyze multiple user interaction indicators, such as, but not limited to, user input, tasks, UE motion, time of day, location, etc. Typically, the UI component 112 can classify data sessions with low "user awareness sensitivity," if the user is not actively interacting with UE 102 and instruct the signaling load optimization component 110 to bundle together the low "user awareness sensitivity" applications. Accordingly, multiple single data connections can be avoided and signaling load can be reduced. Further, the UI component 112 can classify data sessions with high "user awareness sensitivity," if the user is actively interacting with the UE 102 and instruct the signaling load optimization component 110 to disable/delay FD. Accordingly, unnecessary and pre-mature data connection releases and corresponding new data connection setups can be reduced and/or avoided.

In one aspect, the UI component 112 can predict if and/or when (e.g., arrival time) a new data flow request will be initiated by observing a user's interaction with the UE 102. Based on the prediction, the signaling load optimization component 110 can determine whether to bundle data payloads and send the bundled data payloads as one data transmission. Additionally, the signaling load optimization component 110 can identify whether fast dormancy can be disabled/delayed at the end of a given data flow transmission (e.g., due to a prediction that a new data flow request will be initiated shortly).

Real network study has shown that the RNC processor load related to channel switching and data connection setup, e.g., radio resource control (RRC)/radio access bearer (RAB) setup, together can be as high as 70% of the total RNC processor load. Further, study shows that RRC connection establishment (as part of data connection setup) involves multiple signaling handshake messages, not only increasing RNC processing load but also increasing prolong call setup time (latency). Conventional systems employ static state transition timers at RNC level, for all UEs served by the RNC, regardless of the UE type, applications running on these UEs and/or User interactions/awareness of these applications. In contrast, system 100 provides UEs (e.g., UE 102) that can intelligently bundle delay-tolerant data to reduce signaling load and disable/delay FD for situations with high likelihood of close spaced data sessions to reduce signaling load, as well as shorten call setup time. In addition, system 100 can also improve performance and extend battery life of UE 102. Typically, when a new bearer/connection is set up by the UE 102, a ramp-up interval occurs initially, wherein conservative and inefficient attributes produce sub-optimal performance for some time at the beginning of a data flow. With bundling, the number of bearer activations are reduced and proportionally less time is spent in ramp-up; thus leading to improved performance and battery life of UE 102.

Figure 2:
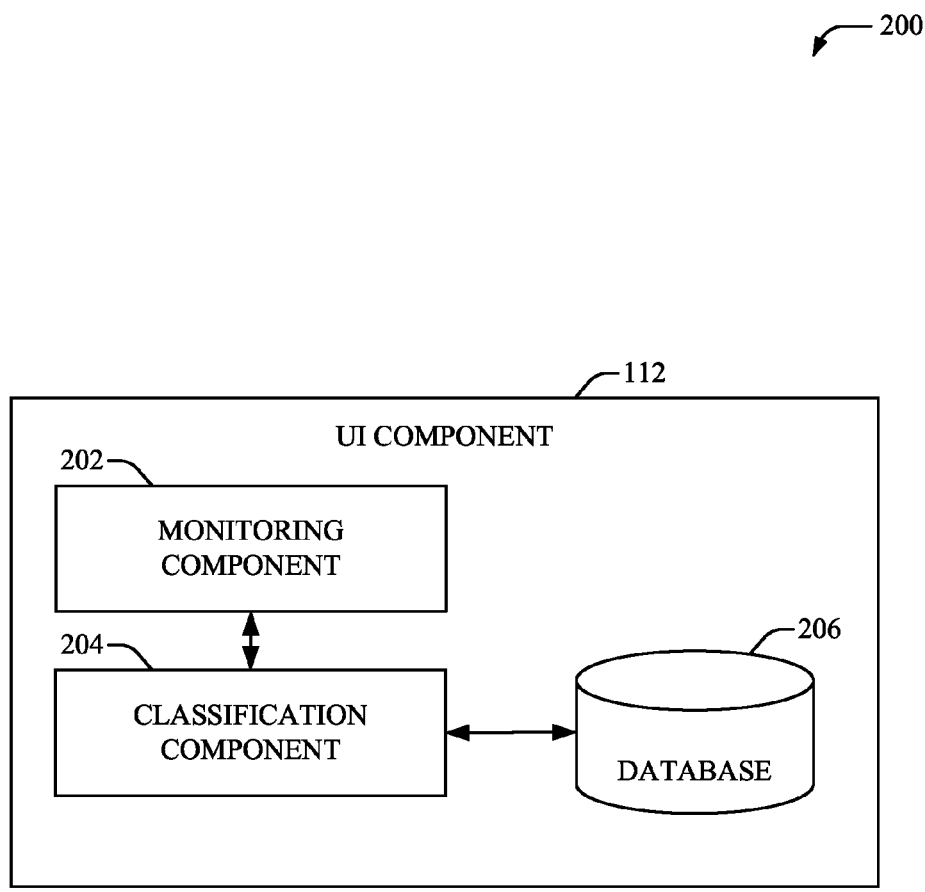
FIG. 2 illustrates an example system that can be employed for observing user interactivity with a user equipment (UE).

Referring to FIG. 2, there illustrated is an example system 200 that can be employed for observing user interactivity with a UE in accordance with an aspect of the subject disclosure. It can be appreciated that the UI component 112 can include functionality, as more fully described herein, for example, with regard to system 100. As discussed supra, in one example, the UI component 112 can reside within a UE, which can be connected to the mobile core network through a wireless radio access network, such as, but not limited to UMTS Terrestrial Radio Access Network (UTRAN). Moreover, the UE can include most any mobile and/or stationary, wireless and/or wired, electronic communication device (e.g., cell phone, PDA, tablet, PC, laptop, etc.).

In one aspect, monitoring component 202 can monitor and/or observe user inputs associated with the UE. For example, the monitoring component 202 can detect that a user is typing, changing a screen (e.g., from off to on, from one application to another, etc.), playing an audio clip with volume greater than a minimum threshold. Typically, the monitoring component 202 can observe user interactions with most any user interface, such as, but not limited to, a keypad, a mouse, a touchscreen, a voice command module, most any human machine interface (HMI), etc. Further, the monitoring component 202 can also detect motion, position and/or orientation, of the UE (e.g., via accelerometer sensors). Typically, these indicators can be employed to identify whether the user is interacting with the UE. Monitoring component 202 can observe/monitor user input and data flow requests (to/from data applications on the UE) looking for time correlations and/or gaps.

Moreover, monitoring component 202 can track and/or observe data flows associated with various applications of the UE. Typically, applications (e.g., email clients, social networking applications, etc.) can pull information from servers within the core network. For example, an email client can periodically gather info regarding status of contacts in address book. Moreover, most any application employed by the UE, for example, with presence-enabled features, webpage update, map refresh, etc. can be observed by monitoring component 202. In one aspect, a classification component 204 can determine whether data flows associated with the applications can wait for a short delay or require real time access.

Further, the classification component 204 can categorize and treat each data flow request according to "interactivity", for example, by considering the user input that preceded the data flow. For example, if a data flow request closely follows user input, the classification component 204 can categorize the request as "interactive". In another example, if audio and/or video playback is in progress, the associated data application can be categorized, by the classification component 204, as "interactive". Alternately, the classification component 204 can categorize a data flow request as "non-interactive" if the data flow request does not follow user input closely and/or does not include media playback. In one example, the classification component 204 can employ most any machine learning/artificial intelligence technique and develop a statistically satisfactory prediction module for a set of data flow.

In addition, the classification component 204 can categorize a set of data flows as "random" due to their random behavior with respect to following user input. The "random" data flows are generally not be included in final decision for optimization of signaling load. Oftentimes, the UE can operate as a mobile hotspot and connect with one or more tethered devices (e.g., laptops, gaming modules, PCs, etc.). In this example scenario, the monitoring component 202 can identify that data is communicated between the RNC and a tethered device and the classification component 204 can categorize the data as "random" or "unknown". Moreover, data flows associated with the tethered devices are not employed for data bundling and/or to delay/disable FD.

Further, classification component 204 can store categories associated with the data flows, and/or the monitored information within database 206. In one example, Interactivity time (IT), can also be stored within database 206. Moreover, the IT indicates how soon after data reception, does the user utilize/interact with the data. For example, if a user typically puts the pertinent application in the foreground soon after data reception then the application/data flow can be considered "interactive". In another example, if the user never opens the application within 15 minutes of incoming data receipt then the application can be considered as "non-interactive" (e.g., for 15 second delay). In one aspect, the monitoring component 202 can observe user interaction after data reception and the classification component 204 can identify whether the application/data flow is "interactive" or "non-interactive". It can be appreciated that the classification component 204 can assign subcategories within the "interactive" and/or "non-interactive" categories. Additionally, the classification component 204 can identify an average IT for "non-interactive" data flows. The average IT can be utilized to identify an optimal bundling interval. For example, if "non-interactive" data is rarely employed/opened by a user within 15 minutes of data reception, then the risk of 15-minute bundling intervals is identified as relatively low.

Typically, the database 206 can include volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data stores, databases, caches) of the subject systems and methods is intended to comprise, without being limited to, these and any other suitable types of memory.

Figure 3:
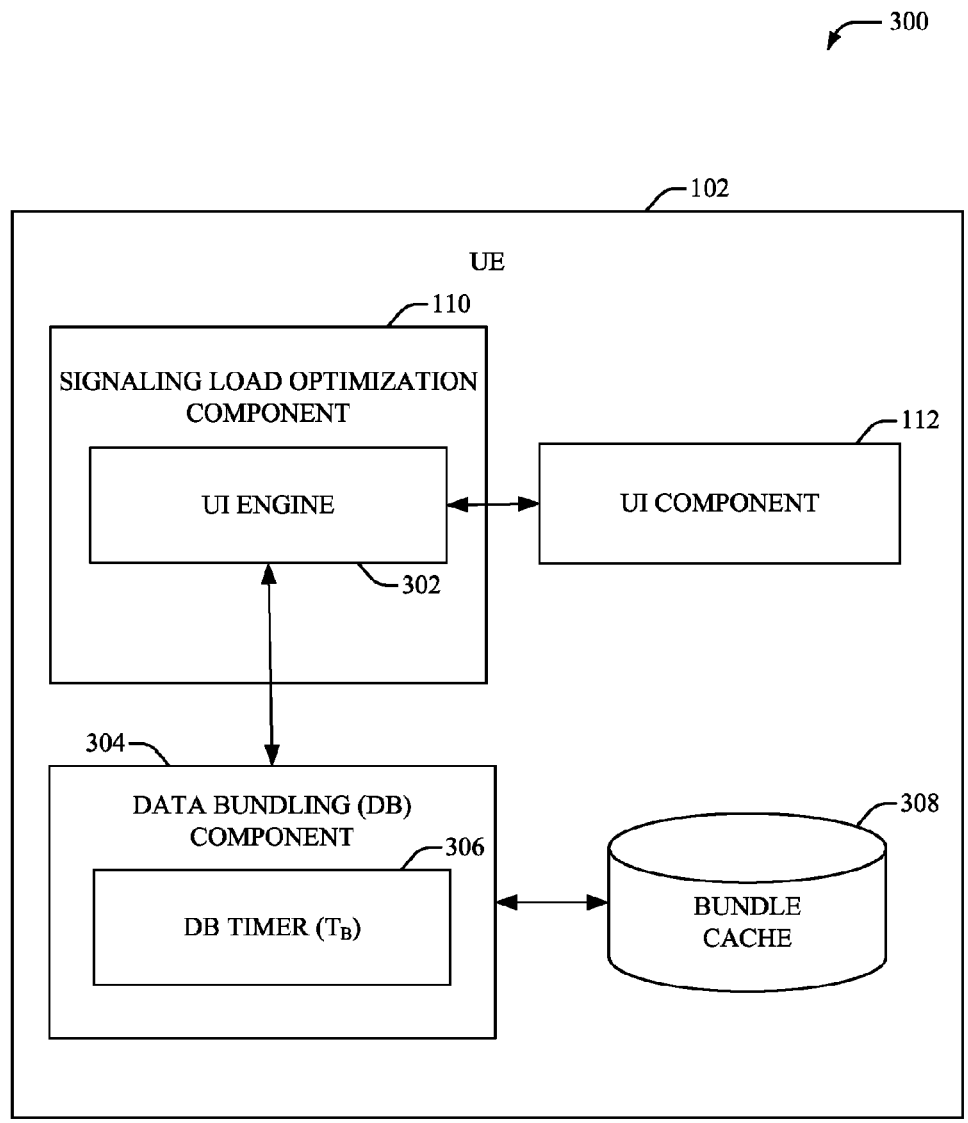
FIG. 3 illustrates an example system that facilitates data bundling based on user interactivity (UI).

Referring now to FIG. 3, there illustrated is an example system 300 that facilitates data bundling based on UI, according to an aspect of the subject disclosure. Specifically, system 300 monitors user interaction with the UE 102 and performs data bundling, to reduce network signaling in the communication network (e.g., UMTS). Moreover, UE 102, signaling load optimization component 110, and UI component 112, can include functionality, as more fully described herein, for example, with regard to systems 100 and 200.

According to an embodiment, a UI engine 302 is utilized to instruct a data bundling (DB) component 304 whether a data flow can be delayed and bundled together with one or more disparate data flows. As noted above, UI component 112 can determine whether a data flow is "interactive," "non-interactive," "random," etc. UI engine 302 can utilize the category data to identify whether the data flow can be bundled or not. In one aspect, UI engine can calculate "user awareness sensitivity" associated with a data flow based on the monitored/classified information. Data sessions with low "user awareness sensitivity" (e.g., "non-interactive", if user is not actively interacting with the UE 102) are identified by the UI engine 302 and the DB component 304 is instructed to perform data bundling to avoid multiple single data connections. Further, data sessions with high "user awareness sensitivity" (e.g., "interactive", if user is actively interacting with the UE 102) are detected by the UI engine 302 and the DB component is instructed not to perform data bundling on the data flow to avoid user perceived latency.

In one example, consider a scenario wherein an application audio and/or video playback is in progress, and the UE display is on with the video in the foreground and/or the audio is played with a specific volume (e.g., the volume is greater than a predefined minimum volume threshold). In this scenario, if a user input can occur less than "X" seconds (e.g., wherein X can be most any positive rational number; X can be predefined, static, and/or dynamically tuned) before the data flow request (e.g., between application processor and radio) is made, then the data flow request is considered to be "interactive" and likely to be followed by another request shortly. For example, the user input can include, but is not limited to, opening an application (APP), selecting a Uniform Resource Locator (URL) link, pressing/clicking a button, and/or performing and/or initiating most any other action. Moreover, in this case, UI engine 302, can instruct the DB component 304 to disable data bundling. In another example, a data flow initiated (e.g., autonomously by the UE 102 or a network server) more than "X" seconds after last user input can be classified as a "non-interactive." The large time distance between user input and the start of the flow can provide an indication that the user is not interacting with the UE 102, not waiting for the data, and/or not likely to request anything else soon. In this example case, the UI engine 302 can instruct the DB component 304 to hold the data request in a bundle cache 308 until a bundling timer ($T_b$) 306 expires. Typically, bundle cache 308 can include a queue that enables mobile-originated requests to stack up.

Further, the bundling timer ($T_b$) 306 can be adjusted automatically and/or dynamically according to load measurements in the network (e.g., measured by monitoring component 202). For example, Ec/Io (ratio of received pilot energy, Ec, to total received energy or the total power spectral density, Io) can be utilized as a network load indicator. If the idle mode UE 102 detects a low Ec/Io whilst camping, it is likely that the network load in the area is high. In this example case, the value of DB timer 306 can be increased. Typically, application time-outs are longer than the bundling timer 306. Moreover, the UE 102 can also hold RRC service requests after receipt of type 1 (idle mode) pages from the PS domain, within the bundling interval. Alternatively, type 1 PS domain pages can be removed for bundling-capable UE 102. In another example, a current uplink interference level (SIB7), to can be identified by UE 102 and utilized by the DB component 304 to dynamically determine and/or scale the bundling delay ($T_b$). For example, if SIB 7 uplink noise is poor, the value of bundling timer ($T_b$) can be increased, to reduce additional loading impact. However, if SIB 7 uplink noise is optimal, the value of bundling timer ($T_b$) can be decreased (e.g., bundling is not performed, or bundling is performed for a very short interval).

After the bundling timer 306 has expired, the DB component 304 can initiate a data flow, process all bundled requests (e.g., stored in bundle cache 308) together and terminate the data flow using fast dormancy immediately after the bundle cache 308 is empty. The DB component 304 can also initiate a PULL request towards all applications, which require a periodic data refresh. In one aspect, the bundle cache 308 can be emptied if a trigger event, for example, a voice call or user input, is received before the bundling timer has expired. Typically, while the UE 102 is active, the core network nodes can still send type 2 pages for incoming data flows.

Often, applications can run in the background without requiring user inputs, for example, an Internet music/radio/media application. To prevent interruption of music/media data file download, UI engine 302 can take into account of certain conditions (e.g., audio with volume greater than a minimum threshold), which can be treated as "interactive". Moreover, the UI engine 302 can mark certain applications and/or conditions as "high awareness applications" (e.g., equivalent as Interactive) which will be excluded from bundling.

Figure 4:
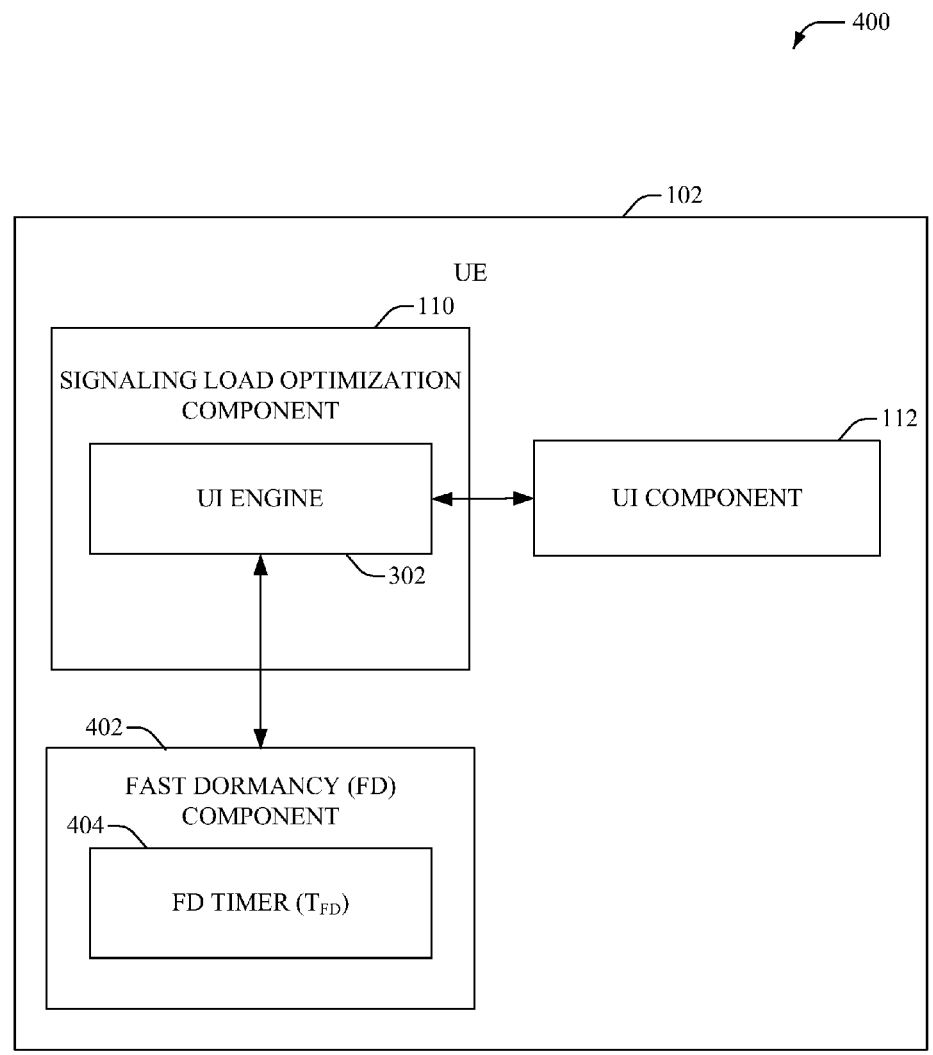
FIG. 4 illustrates an example system that delays fast dormancy (FD) based upon UI.

FIG. 4 illustrates an example system 400 that delays fast dormancy based upon user interactivity, according to an aspect of the subject innovation. Specifically, system 400 monitors various factors, such as, but not limited to, user interaction, network load measurements, UE location, position, and/or orientation, etc., to identify whether FD can be disabled. Moreover, UE 102, signaling load optimization component 110, UI component 112, and the UI engine 302 can include functionality, as more fully described herein, for example, with regard to systems 100, 200 and 300.

Typically, the signaling load optimization component 110 can include an UI engine 302 that is utilized to identify whether data flows should be bundled together, and/or whether fast dormancy should be disabled/delayed. In one aspect, the UI engine 302 can analyze user interaction data (e.g., stored in database 206) associated with an application/data flow to determine whether a new data flow request will be initiated shortly. According to an aspect, the UI engine 302 can predict when a new data flow will be initiated, based on an analysis (e.g., mathematical/statistical/historical) of user interaction, UE position, and/or network load data and/or machine learning techniques. Moreover, the UI engine 302 can also identify whether the fast dormancy mechanism performed by a fast dormancy (FD) component 402 can be temporarily disabled at the end of a data flow transmission (e.g., due to forecast of new data flow request shortly).

In one aspect, if an application or data flow is identified as "interactive", the UI engine 302 can instruct the FD component 402 to disable the FD timer ($T_{FD}$) 404. For example, if a media application is playing on the UE 102, under certain conditions, for example, the video is in the foreground of the UE display, and/or an audio clip is being played with a volume that is above a minimum volume threshold, the application is considered "interactive". Further, if user input has been observed (e.g., by monitoring component 202) "X" seconds before the initiation of the data flow request (between application processor and radio), the data flow request is considered to be "interactive". For "interactive" data flow, the UI engine 302 can determine a high likelihood that the data flow will be followed by another data flow request, within a short delay. For this reason, fast dormancy should not be used and thus FD component 402 can disable or delay the FD timer 404.

In another aspect, if an application or data flow is identified as "non-interactive", the UI engine 302 can instruct the FD component 402 to initiate default handling and perform FD to transition the UE 102 into the IDLE state. For example, if a data flow request is initiated more than "X" seconds after the last user input is received, the data flow can be classified as "non-interactive". For "non-interactive" data flows, the UI engine 302 can determine that the user is not interacting with the device, not waiting for the data and not likely to request anything else soon. Accordingly, the UI engine 302 can compute a low likelihood that a new data request will be initiated on completion of the "non-interactive" data flow. Accordingly, the FD component 402 can trigger the FD timer ($T_{FD}$) 404 on completion of the "non-interactive" data flow and transition the UE to the IDLE state on expiration of the FD timer ($T_{FD}$) 404.

Figure 5:
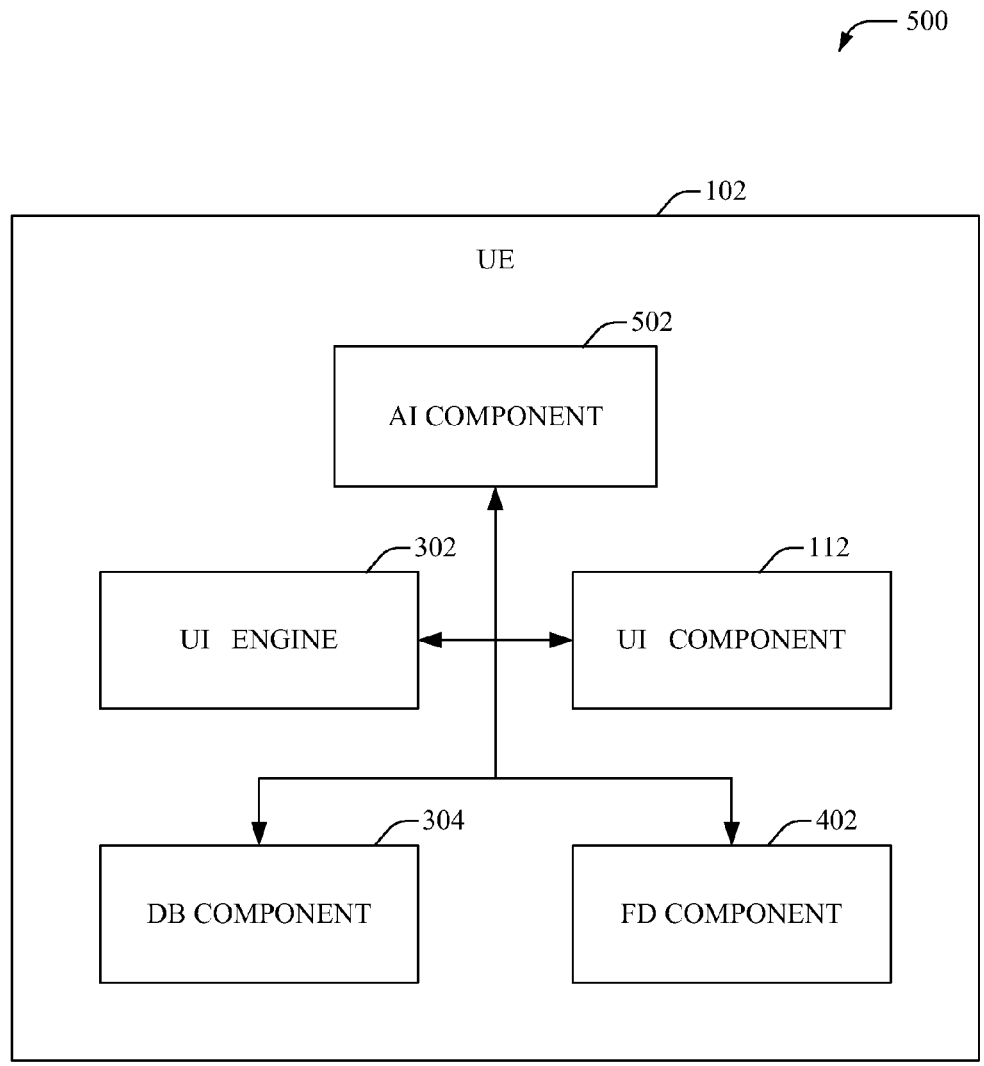
FIG. 5 illustrates an example system that facilitates automating one or more features in accordance with the subject innovation.

FIG. 5 illustrates an example system 500 that employs an artificial intelligence (AI) component 502, which facilitates automating one or more features in accordance with the subject innovation. It can be appreciated that the UE 102, UI component 112, UI engine 302, DB component 304, and FD component 402 can include respective functionality, as more fully described herein, for example, with regard to systems 100-400.

The subject innovation (e.g., in connection with classifying applications/data flows, bundling data flows or applying FD hold) can employ various AI-based schemes for carrying out various aspects thereof. For example, a process for determining whether to delay a data transmission for bundling and/or disable a FD mechanism can be facilitated via an automatic classifier system and process. Moreover, the classifier can be employed to determine an arrival time of a next data flow, classify applications, identify when bundling or FD hold is to be applied, etc.

A classifier is a function that maps an input attribute vector, $x=(x1, x2, x3, x4, xn)$, to a confidence that the input belongs to a class, that is, $f(x)$=confidence(class). Such classification can employ a probabilistic and/or statistical-based analysis (e.g., factoring into the analysis utilities and costs) to prognose or infer an action that a user desires to be automatically performed. In the case of communication systems, for example, attributes can be information (e.g., monitored information, user interactivity, etc.) stored in database 206 and the classes can be categories or areas of interest (e.g., levels of priorities, classification of applications, etc.).

A support vector machine (SVM) is an example of a classifier that can be employed. The SVM operates by finding a hypersurface in the space of possible inputs, which the hypersurface attempts to split the triggering criteria from the nontriggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject innovation can employ classifiers that are explicitly trained (e.g., via a generic training data) as well as implicitly trained (e.g., via observing UE behavior, user interaction, application behavior/activity, application characteristics, receiving extrinsic information, etc.). For example, SVM's are configured via a learning or training phase within a classifier constructor and feature selection module. Thus, the classifier(s) can be used to automatically learn and perform a number of functions, including but not limited to determining according to a predetermined criteria when a data flow can be delayed and bundled together with one or more data flows in a single transmission, when a FD mechanism can be disabled, when a user is interacting with the UE 102, how can application/data flow can be classified, etc. The criteria can include, but is not limited to, historical patterns, UE behavior, user preferences, service provider preferences and/or policies, UE device parameters, network load, location/position/orientation of the UE, etc.

Figure 6:
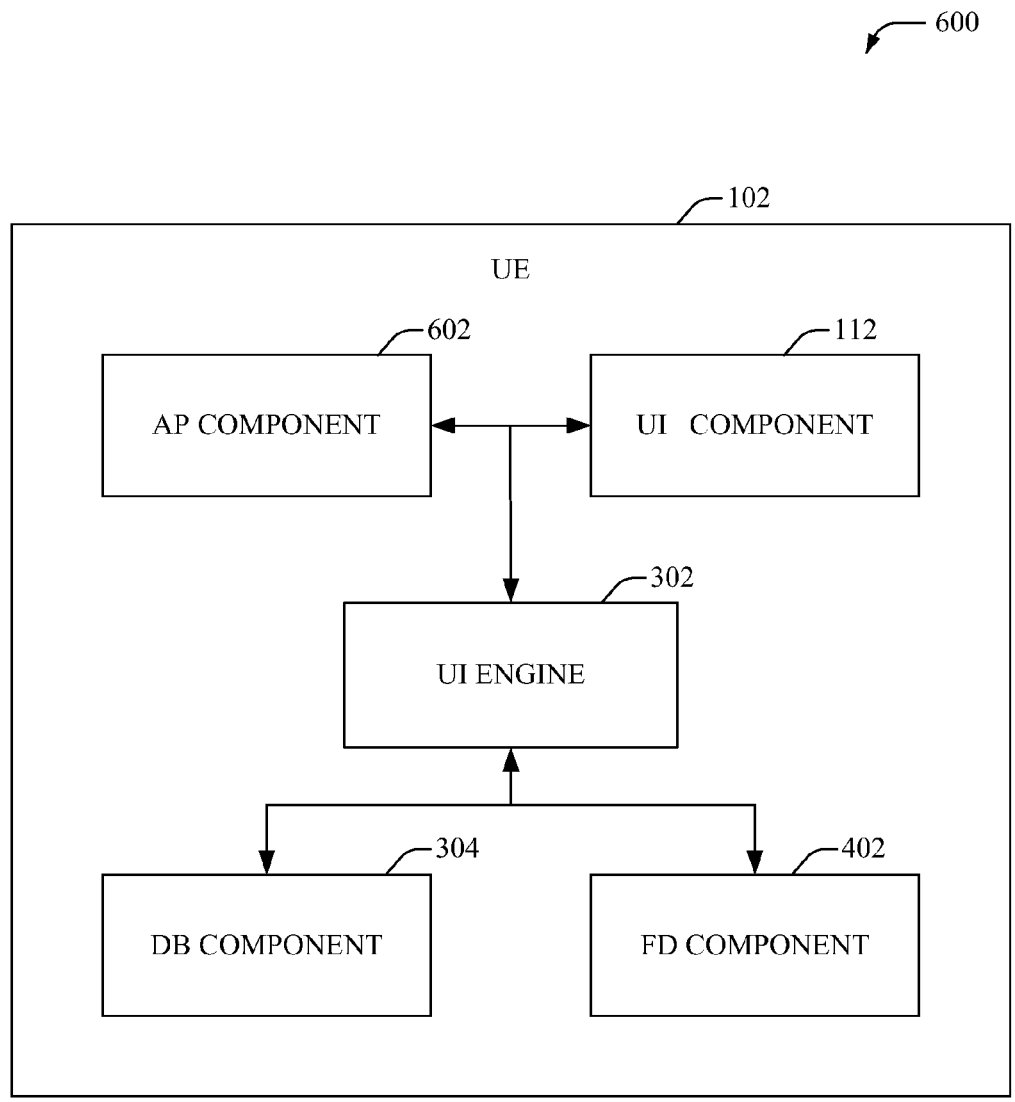
FIG. 6 illustrates an example system that facilitates controlling data bundling and FD based on application profiling.

FIG. 6 illustrates an example system 600 that facilitates data bundling and FD based on application profiling, according to an aspect of the subject innovation. Moreover, system 600 utilizes intelligent learning and characterization of applications employed by the UE 102, to identify delay tolerance applications associated with data sessions. It can be appreciated that the UE 102, UI component 112, UI engine 302, DB component 304, and FD component 402 can include respective functionality, as more fully described herein, for example, with regard to systems 100-500.

As an application on the UE 102 starts to generate data flows, an application profiler (AP) component 602 can track the characteristics of the application and build a histogram for various application characteristics, such as, but not limited to, inter-packet arrival time, frequency of use, packet size, session duration, delay tolerance level etc. Moreover, the AP component 602 can predict arrival time of data flows from multiple applications (downlink or uplink) based on history building and statistical analysis of the tracked characteristics. Based on the arrival time, the UI engine 302 can determine if the current data flow can be delayed and bundled with one or more next data flows, as well as determine whether a fast dormancy timer can be delayed on completion of the current data flow.

The AP component 602 can generate profiles for applications on the UE 102 by monitoring activity and tracking characteristics associated with each application that gener-ates an outgoing data flow request and/or receives an incoming data flow request from the network. Moreover, the AP component 602 can predict if and/or when a new data flow request will be initiated by observing data flow related characteristics of the applications, forecasting trends and/or identifying probabilities for the new data flow request. Based on the prediction, the UI engine 302 can determine whether to bundle data payloads from one or more applications and send the bundled data payloads as one data transmission. Further, the UI engine 302 can identify whether fast dormancy can be disabled/delayed at the end of a given data flow transmission (e.g., due to a prediction that a new data flow request will be initiated shortly).

Figure 7:
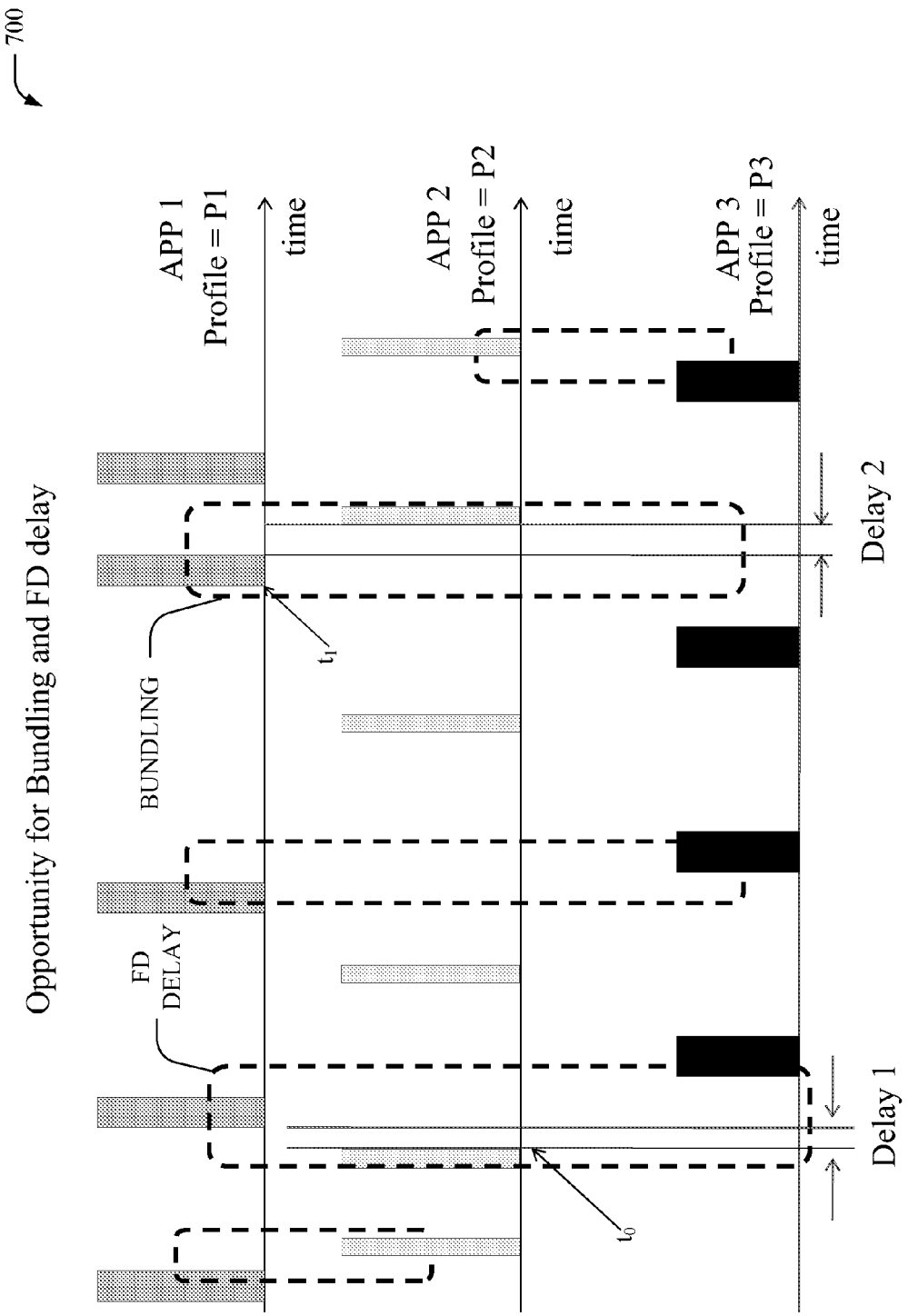
FIG. 7 illustrates an example timeline that depicts when an UI engine can perform data bundling and/or can disable fast dormancy.

Referring to FIG. 7, there illustrated is an example timeline 700 that depicts when the UI engine 302 can perform data bundling and/or can disable fast dormancy. Each bar in FIG. 7 can represent a unique data session of the different applications (APP1-APP3). Although only three applications are illustrated, it can be appreciated that the subject disclosure is not so limited and that most any number of applications can be employed for data bundling and/or detecting when fast dormancy can be disabled.

In one example, at the end of data flow transmission of the second data session of APP 2 (at $t_0$), fast dormancy would be typically triggered by FD component 402. In one aspect, if the UI engine 302 predicts a high likelihood of a second data session of APP1 coming in within 'Delay 1' seconds by determining the time at which the last user input/interaction was received. For example, if the user is interacting with the UE or the last user input was received at a time $T_0$ that is within a predefined delay of X seconds (wherein X can be most any positive rational number), then the UI engine 302 can predict a high likelihood of a second data session being initiated shortly. Accordingly, the UI engine 302 can notify the FD component 402 to hold off FD and allow the network timers to continue the state transition process. Accordingly, the UE can avoid re-establishing a new RRC connection for the second data session of APP1.

In another example, consider a scenario wherein the fourth data flow request of APP1 is received (at $t_1$), the UI engine 302 can predict, based on user interaction, that another data flow request, for example, the fifth data flow request of APP2 will be initiated within a short delay. Typically, if the UI engine 302 predicts an initiation new data flow within a short delay, the fourth data flow request of APP1 can be held in a bundle cache, until the DB timer expires. According to one aspect, if the fifth data flow request of APP2 is not initiated before the DB timer expires, the UI engine 302 can notify the DB component 304 to release the hold and allow the fourth data flow request of APP1 to be sent/received. Alternately, when the fifth data flow request of APP2 is initiated within the DB timer, the DB component 304 can bundle the fourth data flow request of APP1 and the fifth data flow request of APP2, and transmit the data flows together. In another example scenario, wherein APP3 is profiled by the UI engine 302 as "interactive" and/or "high awareness" application (e.g., such as web browsing application, mapping application, gaming application, etc.), a delay will not be applied (e.g., by the DB component 304) for any data flow request to/from APP3.

Figure 8:
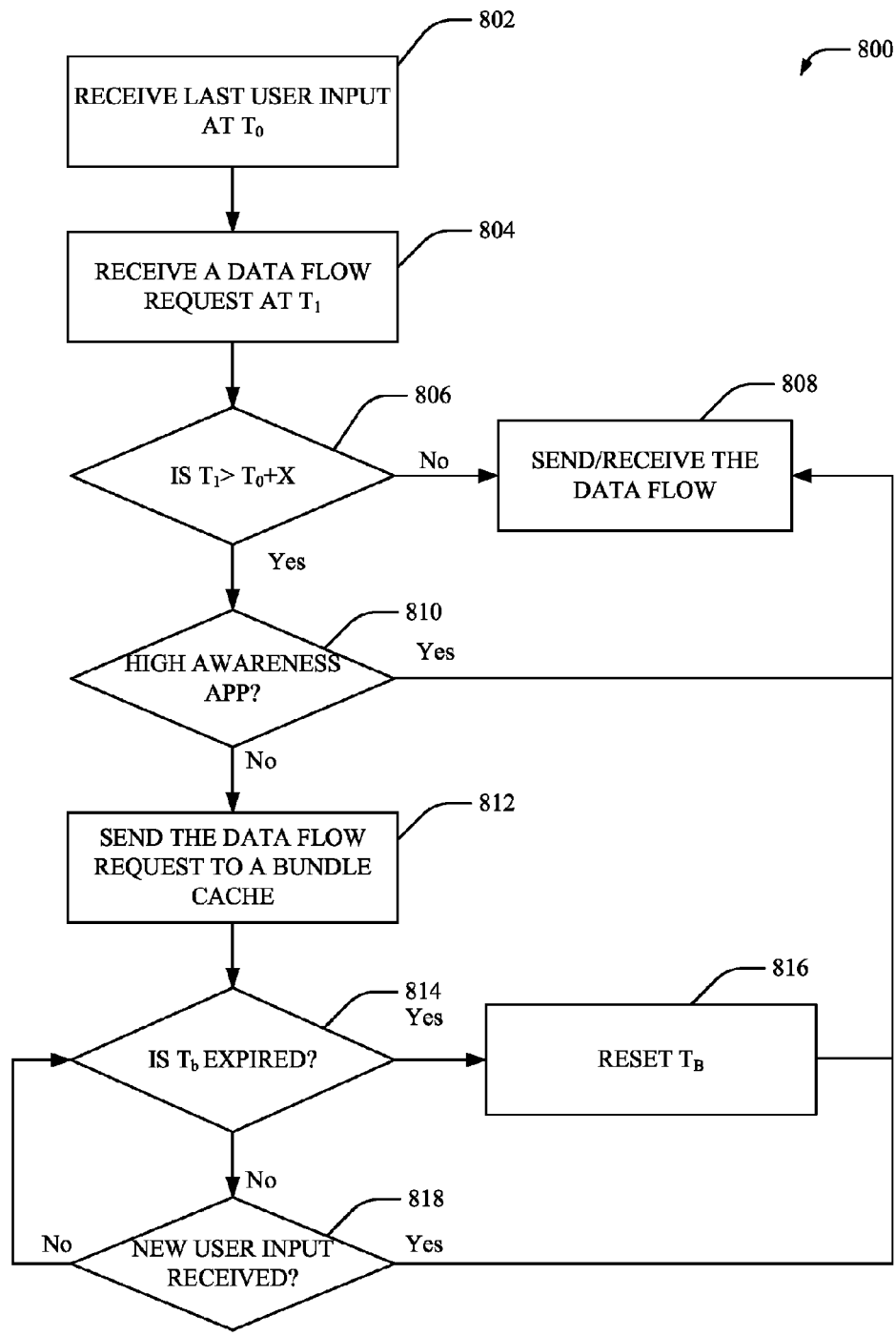
FIG. 8 illustrates an example methodology that can be utilized to facilitate data bundling, based on UI.
Figure 9:
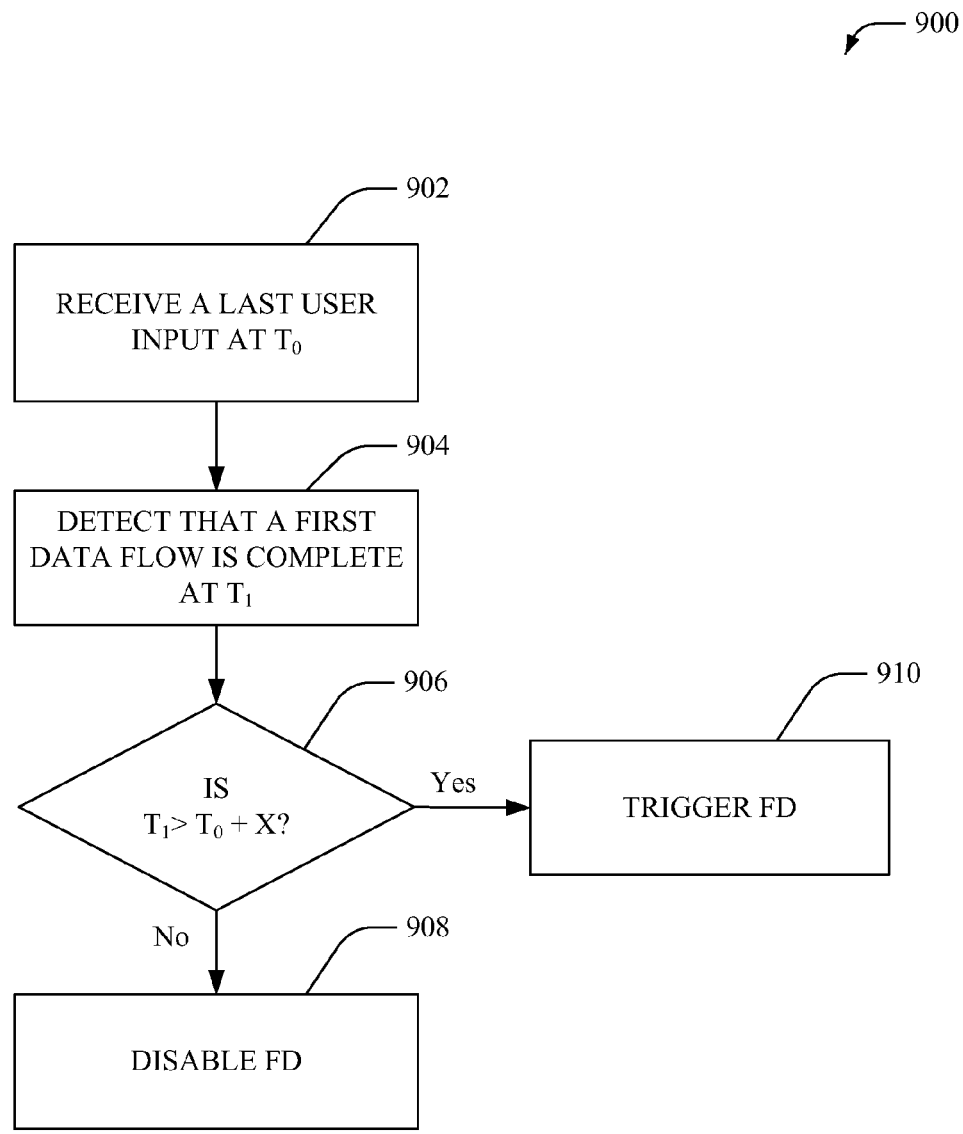
FIG. 9 illustrates an example methodology that overrides a FD mechanism based on UI.

FIGS. 8-9 illustrate methodologies and/or flow diagrams in accordance with the disclosed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device or computer-readable storage/communications media.

Referring now to FIG. 8, illustrated is an example methodology 800 that can be utilized to facilitate data bundling, based on user interactivity, according to an aspect of the subject disclosure. Typically, methodology 800 can be performed by a UE, such as, but not limited to, a cellular phone, a laptop, a tablet, a PC, a PDA, a netbook, a gaming module, a media player, a media recorder, a media viewer, etc. Further, methodology 800 provides automated intelligence to bundle closely spaced data payloads from different applications, such that, data packets from different applications can be stacked and sent in one single connection, instead of sending each data packet individually over different connections. As a result, the amount of signaling events can be substantially reduced, leading to a decrease in RNC processing load.

At 802, last user input can be received at time $T_0$, for example, at the UE. Typically, user input can include, but is not limited to, typing, changing screens (from off to on or from one application to another), playing audio with volume greater than a minimum threshold, moving the UE, etc. At 804, a data flow request can be received at time $T_1$. As an example, the data flow request can be initiated by the UE and/or a network server. According to an embodiment, at 806, it can be determined whether the $T_1 > T_0 + X$, wherein X can be most any time delay in seconds. Typically X can be predefined and/or dynamically adjusted. If $T_1$ is not greater than $T_0 + X$, then the data flow request can be identified as "interactive", and at 808, the data flow request can be sent/received. Alternately, if $T_1$ is greater than $T_0 + X$, the data flow request can be identified as "non-interactive", and at 810, it can be identified whether the application associated with the data flow request is a "high awareness" application.

For example, "high awareness" applications can run, on the UE, in the background without requiring user inputs, such as, but not limited to, an internet radio application. To prevent interruption of music data file download, methodology 800 can consider various conditions, for example, audio volume while dynamically determining "high awareness". Moreover, applications can be marked as "high awareness applications", if certain conditions exist. It can be appreciated that certain applications can always (e.g., at all times, under all conditions) be marked as "high awareness applications." If identified that the application associated with the data flow request is a "high awareness" application, the data flow can be sent/received (as shown at 808); else at 812, the data flow request can be sent to (and stored within) a bundle cache.

Further, at 814, it can be identified if a bundle timer $T_b$ has expired. If $T_b$ has expired, at 816, the timer can be reset and the data flow can be sent/received. Typically, if another data flow request is received prior to the expiration of the bundle timer $T_b$, both the data flow can be bundled together and transmitted over a single connection. Alternately, if $T_b$ has not expired, the methodology 800 can wait to receive the next data flow. In one aspect, $T_b$ can be dynamically adjusted based on current network load measurements. Furthermore, at 818 it can be detected whether a new user input is received. If not, the methodology returns to 814 and waits for a next data flow until $T_b$ expires. In contrast, on receiving a new user input, the bundling is interrupted and the data flow(s) can be sent/received (as shown at 808).

It can be appreciated that although methodology 800 illustrates an example scenario wherein one data flow is requested by an upper layer application at time $T_1$, it can be appreciated that the subject disclosure is not so limited, and that most any number of data flow requests can made by other applications at time $T_2$, $T_3$, etc. As long as Bundle Timer $T_b$ does not expired and data flow request satisfies the conditions specified in the flow diagram, such data flow request will be placed into bundle queue. Further, a user input can interrupt the bundling at any time (e.g., when user interaction is detected), such that a delay is not perceived by user.

FIG. 9 illustrates an example methodology 9000 that overrides a FD mechanism based on user interactivity, according to an aspect of the subject innovation. Moreover, methodology 900 can prevent unnecessary and pre-mature data connection releases (and corresponding new data connection setups) by temporarily delaying/disabling FD, resulting in reduced signaling load on RNC and improved user perceived latency. At 902, a last user input is received at time $T_0$. Typically, the user input can be received via most any user interface associated with the UE, such as, but not limited to, a keyboard, a touch screen, a sensor, a camera, a mouse, a hardware button, etc.

At 904 completion of a first data flow can be detected at $T_1$. Typically, once the data flow is completed, multiple inactivity timers ($T_{DCH\_to\_FACH}$, $T_{FACH\_to\_IDLE}$) are initiated by the RNC, upon expiration of which the UE transitions from DCH to FACH and FACH to IDLE state. In addition, the UE can initiate a FD timer ($T_{FD}$) to initiate direct transition from DCH to IDLE or FACH to IDLE, before the network inactivity timers expire. At 906, it can be determined whether $T_1 > T_0 + X$ wherein X can be most any time delay in seconds. Typically X can be predefined and/or dynamically adjusted. Moreover, if $T_1$ is greater than $T_0 + X$, the data flow request can be identified as "non-interactive", and at 908, the FD mechanism can be disabled. As an example, the FD timer can be disabled or delayed. However, if $T_1$ is not greater than $T_0 + X$, then the data flow request can be identified as "interactive", and at 910, FD can be triggered to transition the UE to the IDLE state.

Figure 10:
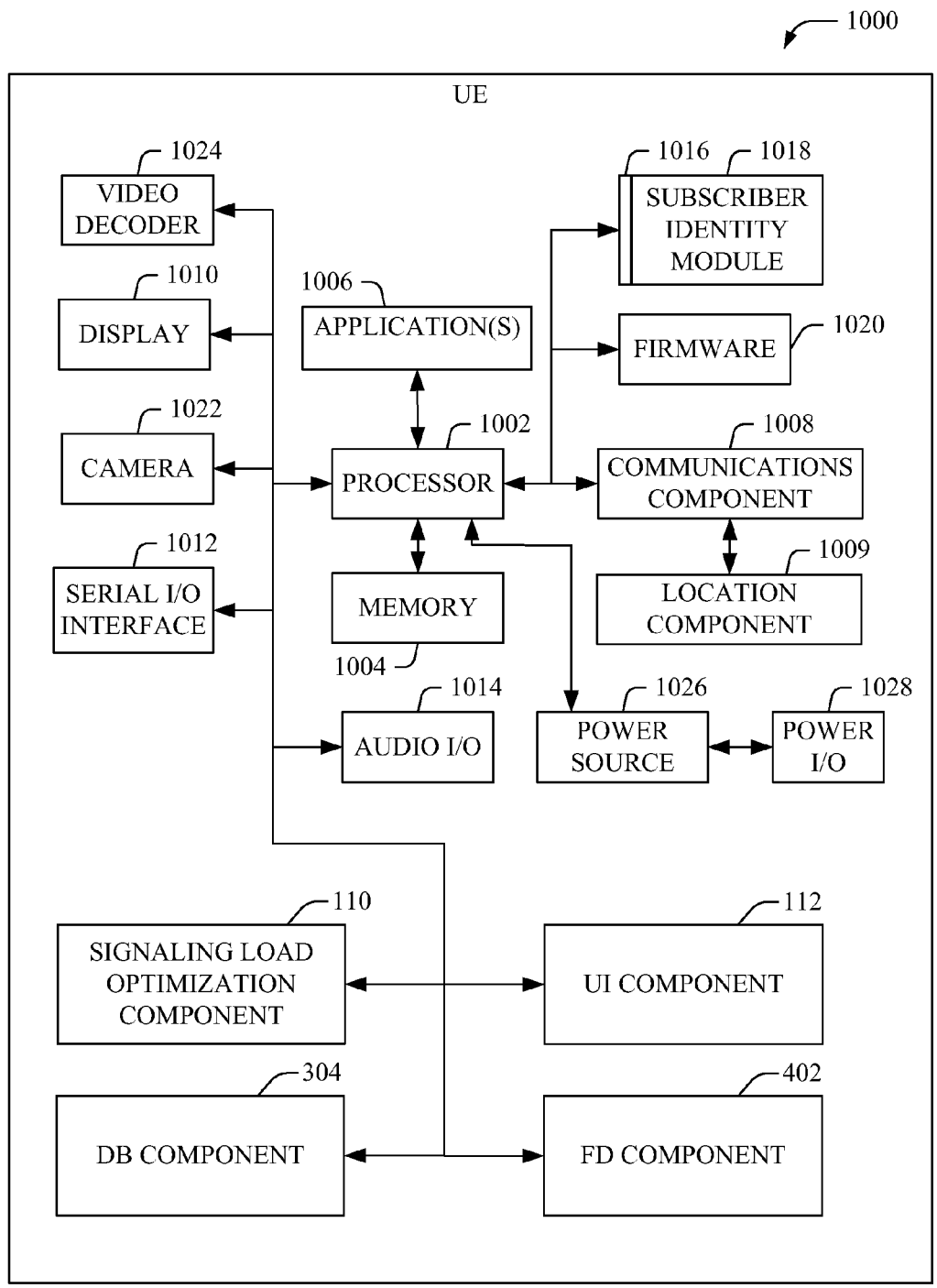
FIG. 10 illustrates a block diagram of a UE suitable for data bundling and controlling FD based on UI in accordance with the innovation.

Referring now to FIG. 10, there is illustrated a block diagram of a UE 1000 that reduces RNC load, based on UI in accordance with the innovation. The UE 1000 can include a processor 1002 for controlling all onboard operations and processes. A memory 1004 can interface to the processor 1002 for storage of data and one or more applications 1006 being executed by the processor 1002. A communications component 1008 can interface to the processor 1002 to facilitate wired/wireless communication with external systems (e.g., femtocell and macro cell). The communications component 1008 interfaces to a location component 1009 (e.g., GPS transceiver) that can facilitate location detection of the UE 1000. Note that the location component 1009 can also be included as part of the communications component 1008.

The UE 1000 can include a display 1010 for displaying content downloaded and/or for displaying text information related to operating and using the device features. A serial I/O interface 1012 is provided in communication with the processor 1002 to facilitate serial communication (e.g., USB, and/or IEEE 1394) via a hardwire connection. Audio capabilities are provided with an audio I/O component 1014, which can include a speaker for the output of audio signals related to, for example, recorded data or telephony voice data, and a microphone for inputting voice signals for recording and/or telephone conversations.

The device 1000 can include a slot interface 1016 for accommodating a subscriber identity module (SIM) 1018. Firmware 1020 is also provided to store and provide to the processor 1002 startup and operational data. The UE 1000 can also include an image capture component 1022 such as a camera and/or a video decoder 1024 for decoding encoded multimedia content. The UE 1000 can also include a power source 1026 in the form of batteries, which power source 1026 interfaces to an external power system or charging equipment via a power I/O component 1028. In addition, the UE 1000 can be substantially similar to and include functionality associated with UE 102 described supra. Moreover, UE 1000 can include a signaling load optimization component 110, UI component 112, DB component 304, and FD component 402, which can include respective functionality, as more fully described herein, for example, with regard to systems 100-600.

Figure 11:
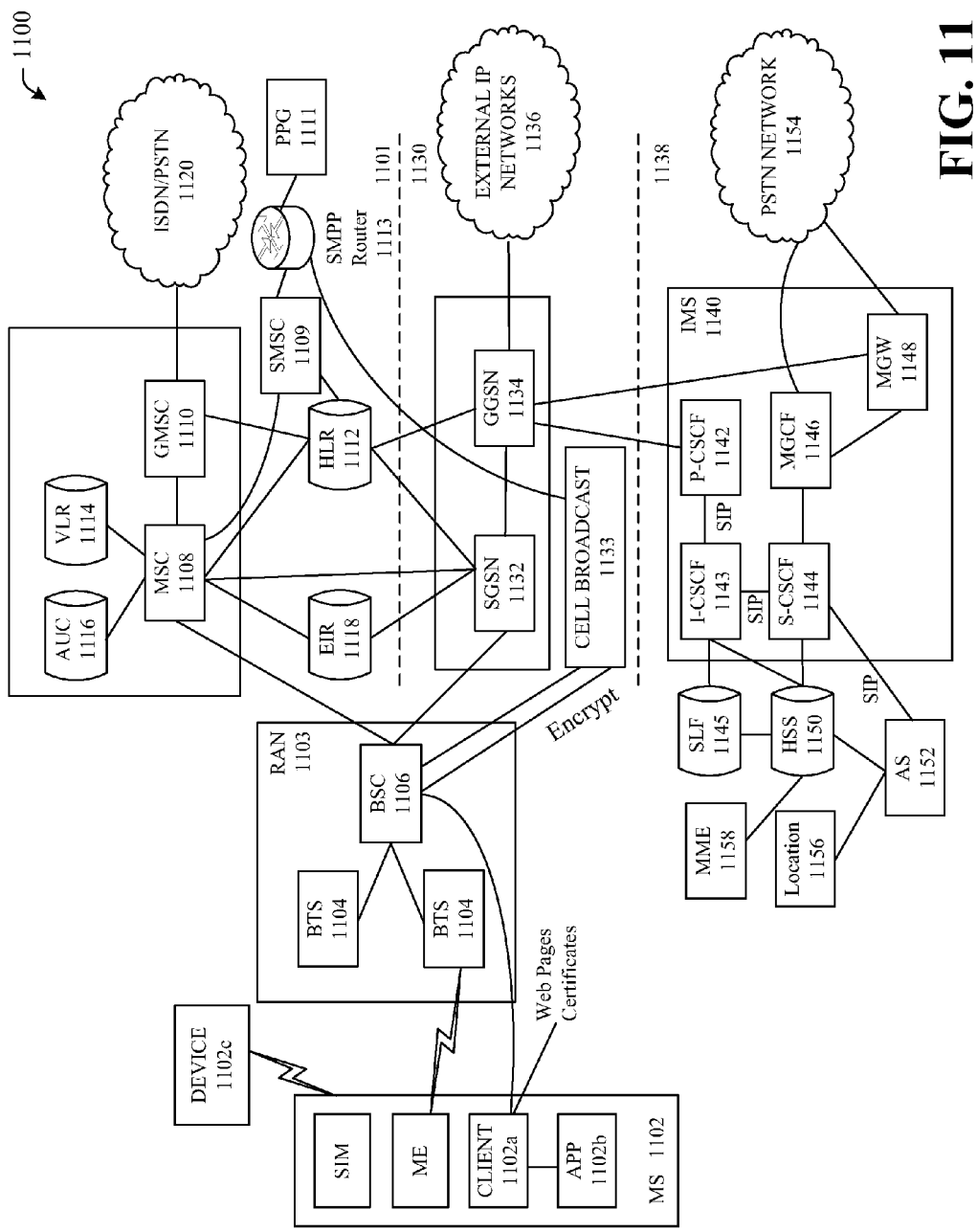
FIG. 11 illustrates a Global System for Mobile Communications (GSM)/General Packet Radio Service (GPRS)/Internet protocol (IP) multimedia network architecture that can employ the disclosed architecture.

Now turning to FIG. 11, such figure depicts an example GSM/GPRS/IP multimedia network architecture 1100 that can employ the disclosed communication architecture. In particular, the GSM/GPRS/IP multimedia network architecture 1100 includes a GSM core network 1101, a GPRS network 1130 and an IP multimedia network 1138. The GSM core network 1101 includes a Mobile Station (MS) 1102, at least one Base Transceiver Station (BTS) 1104 and a Base Station Controller (BSC) 1106. The MS 1102 is physical equipment or Mobile Equipment (ME), such as a mobile phone or a laptop computer that is used by mobile subscribers, with a Subscriber identity Module (SIM). The SIM includes an International Mobile Subscriber Identity (IMSI), which is a unique identifier of a subscriber. The MS 1102 includes an embedded client 1102a that receives and processes messages received by the MS 1102. The embedded client 1102a can be implemented in JAVA and is discuss more fully below. It can be appreciated that MS 1102 can be substantially similar to UE 102 and include functionality described with respect to UE 102 in systems 100, 200, and 400-600.

The embedded client 1102a communicates with an application 1102b (e.g., application(s) 202) that provides services and/or information to an end user. Additionally or alternately, the MS 1102 and a device 1102c can be enabled to communicate via a short-range wireless communication link, such as BLUETOOTH®. As one of ordinary skill in the art would recognize, there can be an endless number of devices 1102c that use the SIM within the MS 1102 to provide services, information, data, audio, video, etc. to end users.

The BTS 1104 is physical equipment, such as a radio tower, that enables a radio interface to communicate with the MS 1102. Each BTS can serve more than one MS. The BSC 1106 manages radio resources, including the BTS. The BSC 1106 can be connected to several BTSs. The BSC and BTS components, in combination, are generally referred to as a base station (BSS) or radio access network (RAN) 1103.

The GSM core network 1101 also includes a Mobile Switching Center (MSC) 1108, a Gateway Mobile Switching Center (GMSC) 1110, a Home Location Register (HLR) 1112, Visitor Location Register (VLR) 1114, an Authentication Center (AuC) 1118, and an Equipment Identity Register (EIR) 1118. The MSC 1108 performs a switching function for the network. The MSC also performs other functions, such as registration, authentication, location updating, handovers, and call routing. The GMSC 1110 provides a gateway between the GSM network and other networks, such as an Integrated Services Digital Network (ISDN) or Public Switched Telephone Networks (PSTNs) 1120. In other words, the GMSC 1110 provides interworking functionality with external networks.

The HLR 1112 is a database or component(s) that comprises administrative information regarding each subscriber registered in a corresponding GSM network. The HLR 1112 also includes the current location of each MS. The VLR 1114 is a database or component(s) that contains selected administrative information from the HLR 1112. The VLR contains information necessary for call control and provision of subscribed services for each MS currently located in a geographical area controlled by the VLR. The HLR 1112 and the VLR 1114, together with the MSC 1108, provide the call routing and roaming capabilities of GSM. The AuC 1116 provides the parameters needed for authentication and encryption functions. Such parameters allow verification of a subscriber's identity. The EIR 1118 stores security-sensitive information about the mobile equipment.

A Short Message Service Center (SMSC) 1109 allows one-to-one Short Message Service (SMS) messages to be sent to/from the MS 1102. A Push Proxy Gateway (PPG) 1111 is used to "push" (e.g., send without a synchronous request) content to the MS 1102. The PPG 1111 acts as a proxy between wired and wireless networks to facilitate pushing of data to the MS 1102. A Short Message Peer to Peer (SMPP) protocol router 1113 is provided to convert SMS-based SMPP messages to cell broadcast messages. SMPP is a protocol for exchanging SMS messages between SMS peer entities such as short message service centers. It is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 1102 sends a location update including its current location information to the MSC/VLR, via the BTS 1104 and the BSC 1106. The location information is then sent to the MS's HLR. The HLR is updated with the location information received from the MSC/VLR. The location update also is performed when the MS moves to a new location area. Typically, the location update is periodically performed to update the database as location-updating events occur.

The GPRS network 1130 is logically implemented on the GSM core network architecture by introducing two packet-switching network nodes, a serving GPRS support node (SGSN) 1132, a cell broadcast and a Gateway GPRS support node (GGSN) 1134. The SGSN 1132 is at the same hierarchical level as the MSC 1108 in the GSM network. The SGSN controls the connection between the GPRS network and the MS 1102. The SGSN also keeps track of individual MS's locations, security functions, and access controls.

A Cell Broadcast Center (CBC) 1133 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 1134 provides a gateway between the GPRS network and a public packet network (PDN) or other IP networks 1136. That is, the GGSN provides interworking functionality with external networks, and sets up a logical link to the MS through the SGSN. When packet-switched data leaves the GPRS network, it is transferred to an external TCP-IP network 1136, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN. In a GSM/GPRS network, GPRS services and GSM services can be used in parallel. A GPRS network 1130 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how signal towards the network. The network operation mode represents the capabilities of the GPRS network.

The IP multimedia network 1138 was introduced with 3GPP Release 5, and includes an IP multimedia subsystem (IMS) 1140 to provide rich multimedia services to end users. A representative set of the network entities within the IMS 1140 are a call/session control function (CSCF), a media gateway control function (MGCF) 1146, a media gateway (MGW) 1148, and a master subscriber database, called a home subscriber server (HSS) 1150. The HSS 1150 can be common to the GSM network 1101, the GPRS network 1130 as well as the IP multimedia network 1138.

The IP multimedia system 1140 is built around the call/session control function, of which there are three types: an interrogating CSCF (I-CSCF) 1143, a proxy CSCF (P-CSCF) 1142, and a serving CSCF (S-CSCF) 1144. The P-CSCF 1142 is the MS's first point of contact with the IMS 1140. The P-CSCF 1142 forwards session initiation protocol (SIP) messages received from the MS to an SIP server in a home network (and vice versa) of the MS. The P-CSCF 1142 can also modify an outgoing request according to a set of rules defined by the network operator (for example, address analysis and potential modification).

The I-CSCF 1143 forms an entrance to a home network and hides the inner topology of the home network from other networks and provides flexibility for selecting an S-CSCF. The I-CSCF 1143 can contact a subscriber location function (SLF) 1145 to determine which HSS 1150 to use for the particular subscriber, if multiple HSS's 1150 are present. The S-CSCF 1144 performs the session control services for the MS 1102. This includes routing originating sessions to external networks and routing terminating sessions to visited networks. The S-CSCF 1144 also decides whether an application server (AS) 1152 is required to receive information on an incoming SIP session request to ensure appropriate service handling. This decision is based on information received from the HSS 1150 (or other sources, such as an application server 1152). The AS 1152 also communicates to a location server 1156 (e.g., a Gateway Mobile Location Center (GMLC)) that provides a position (e.g., latitude/longitude coordinates) of the MS 1102. The MME 1158 provides authentication of a user by interacting with the HSS 1150 in LTE networks.

The HSS 1150 contains a subscriber profile and keeps track of which core network node is currently handling the subscriber. It also supports subscriber authentication and authorization functions (AAA). In networks with more than one HSS 1150, a subscriber location function provides information on the HSS 1150 that contains the profile of a given subscriber.

The MGCF 1146 provides interworking functionality between SIP session control signaling from the IMS 1140 and ISUP/BICC call control signaling from the external GSTN networks (not shown). It also controls the media gateway (MGW) 1148 that provides user-plane interworking functionality (e.g., converting between AMR- and PCM-coded voice). The MGW 1148 also communicates with a PSTN network 1154 for TDM trunks. In addition, the MGCF 1146 communicates with the PSTN network 1154 for SS7 links.

Figure 12:
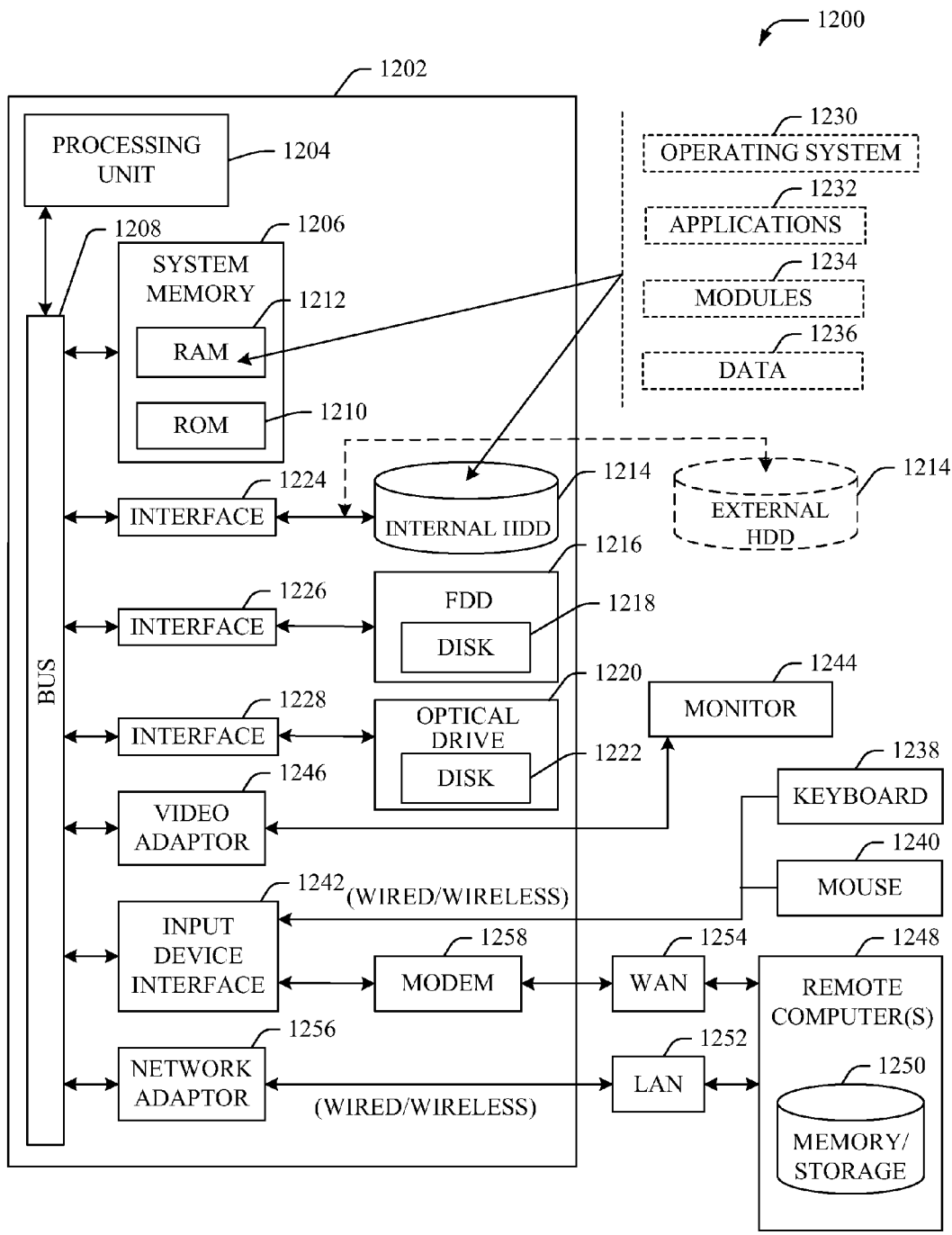
FIG. 12 illustrates a block diagram of a computer operable to execute the disclosed communication architecture.

Referring now to FIG. 12, there is illustrated a block diagram of a computer operable to execute the disclosed communication architecture. In order to provide additional context for various aspects of the subject specification, FIG. 12 and the following discussion are intended to provide a brief, general description of a suitable computing environment 1200 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various aspects of the specification includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes read-only memory (ROM) 1210 and random access memory (RAM) 1212. A basic input/output system (BIOS) is stored in a non-volatile memory 1210 such as ROM, EPROM, EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), which internal hard disk drive 1214 can also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1394 interface technologies. Other external drive connection technologies are within contemplation of the subject specification.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to a HDD, a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods of the specification.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is appreciated that the specification can be implemented with various commercially available operating systems or combinations of operating systems.

A user can enter commands and information into the computer 1202 through one or more wired/wireless input devices, e.g., a keyboard 1238 and a pointing device, such as a mouse 1240. Other input devices (not shown) can include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 1394 serial port, a game port, a USB port, an IR interface, etc.

A monitor 1244 or other type of display device is also connected to the system bus 1208 via an interface, such as a video adapter 1246. In addition to the monitor 1244, a computer typically includes other peripheral output devices (not shown), such as speakers, printers, etc.

The computer 1202 can operate in a networked environment using logical connections via wired and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 is connected to the local network 1252 through a wired and/or wireless communication network interface or adapter 1256. The adapter 1256 can facilitate wired or wireless communication to the LAN 1252, which can also include a wireless access point disposed thereon for communicating with the wireless adapter 1256.

When used in a WAN networking environment, the computer 1202 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 via the serial port interface 1242. In a networked environment, program modules depicted relative to the computer 1202, or portions thereof, can be stored in the remote memory/storage device 1250. It will be appreciated that the network connections shown are example and other means of establishing a communications link between the computers can be used.

The computer 1202 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11(a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nanoscale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system comprising:
   a memory to store instructions; and
   a processor, coupled to the memory, that facilitates execution of the instructions to perform operations comprising:
      receiving interactivity data representative of interaction with a user equipment,
      in response to determining that a first data flow associated with the user equipment has been completed, determining, based on the interactivity data, timing data indicative of an arrival time associated with receiving a request for a second data flow associated with the user equipment, and
      in response to determining that the arrival time is within a time period between a first expiration of a first timer associated with the user equipment and second expiration of a second timer associated with a network device, delaying the first expiration of the first timer, wherein the first timer and the second timer are employed to transition the user equipment to an idle state that facilitates a disconnection of a radio resource connection link employed to transmit the first data flow.

2. The system of claim 1, wherein the receiving comprises receiving motion data indicative of motion of the user equipment.

3. The system of claim 1, wherein the operations further comprise:
   in response to determining that the arrival time is not within the time period and that the first timer has expired, facilitating a transition of the user equipment to the idle state.

4. The system of claim 1, wherein the delaying comprises delaying the first timer in response to determining that the first data flow is classified as an interactive data flow.

5. The system of claim 1, wherein the determining the timing data comprises determining the timing data based on network load data associated with a communication network to which the user equipment is coupled.

6. The system of claim 1, wherein the timing data is first timing data, the arrival time is first arrival time, the request is a second request, and the operations further comprise:
   in response to receiving a first request for the first data flow, determining, based on the interactivity data, second timing data indicative of a second arrival time associated with receiving a third request for a third data flow associated with the user equipment.

7. The system of claim 6, wherein the operations further comprise:
   determining that the first data flow is to be bundled with the third data flow based on determining that the second timing data satisfies a defined timing criterion.

8. The system of claim 7, wherein the operations further comprise:
   in response to the determining that the first data flow is to be bundled with the third data flow, delaying a transmission of data associated with the first data flow until a third request for the third data flow is received.

9. The system of claim 8, wherein the time period is a first time period and the delaying the transmission further comprises delaying the transmission of the data in response to determining that a third timer has not expired, wherein the third timer provides a second time period for which the first data flow can be delayed and wherein the second time period is adjusted according to load measurement data representing a network load associated with a communication network to which the user equipment is coupled.

10. The system of claim 7, wherein the operations further comprise:
   determining that the first data flow is not to be bundled with the third data flow based on determining that the second timing data does not satisfy the defined timing criterion.

11. The system of claim 8, wherein the delaying the transmission further comprises delaying the transmission of the data in response to determining that media playback is in progress on the user equipment.

12. The system of claim 1, wherein the delaying comprises delaying the first expiration of the first timer in response to determining that media playback is in progress on the user equipment.

13. A method, comprising:
   monitoring, by a system comprising a processor, interaction with a user equipment to determine characteristic data associated with a set of data flows related to the user equipment;
   determining, by the system, timing data indicative of an arrival time of a next data flow after a data flow based on the characteristic data; and
   disabling, by the system, a first timer associated with the user equipment in response to determining a completion of the data flow based on the timing data, wherein the disabling comprises disabling the first timer in response to determining that the arrival time of the next data flow is between a first expiration time of the first timer and a second expiration time of a second timer associated with a network device, wherein the first timer and the second timer are employed to transition the user equipment to an idle state that facilitates a disconnection of a radio resource connection link employed to transmit the data flow.

14. The method of claim 13, further comprising:
   classifying, by the system, the set of data flows based on input data that preceded the set of data flows.

15. The method of claim 14, wherein the determining the timing data comprises determining, based on the classifying, information indicative of a likelihood of receiving a request for the next data flow within a defined time period.

16. The method of claim 13, wherein the monitoring comprises determining motion data that represents motion of the user equipment.

17. The method of claim 13, wherein the data flow is a first data flow, the next data flow is a second data flow, and the method further comprises:
   in response to receiving a request for the first data flow, determining, by the system, classification data indicative of a classification assigned to the first data flow; and
   in response to determining, based on the classification data, that the first data flow is classified as a non-interactive data flow, delaying a transmission of the first data flow until a subsequent request for a third data flow is determined to have been received.

18. The method of claim 13, further comprising:
   in response to receiving a request for the data flow, determining, by the system, classification data indicative of a classification assigned to the data flow, wherein the disabling comprises disabling the first timer in response to determining, based on the classification data, that the data flow is classified as an interactive data flow.

19. A computer readable storage device comprising computer-executable executable instructions that, in response to execution, cause a system comprising a processor, to perform operations, comprising:
   determining interaction data based on monitoring interaction with a user equipment;
   in response to determining that a first data flow associated with a user equipment has been completed, determining, based on the interaction data, likelihood data indicative of a likelihood that an arrival time of a request for a second data flow is subsequent to a first expiration of a first timer implemented by the user equipment and prior to a second expiration of a second timer implemented by a network device, wherein the first timer and the second timer are employed to transition the user equipment to an idle state that facilitates disconnection of a radio resource connection link employed to transmit the first data flow; and
   in response to determining that the likelihood satisfies a defined criterion, delaying the first expiration of the first timer.

20. The computer readable storage device of claim 19, wherein the delaying comprises
   delaying the first expiration of the first timer in response to determining that the first data flow is classified as an interactive data flow.

* * * * *